May 26, 1931. A. E. CHURCH 1,807,385
CHUCK
Filed Jan. 25, 1929 2 Sheets-Sheet 1
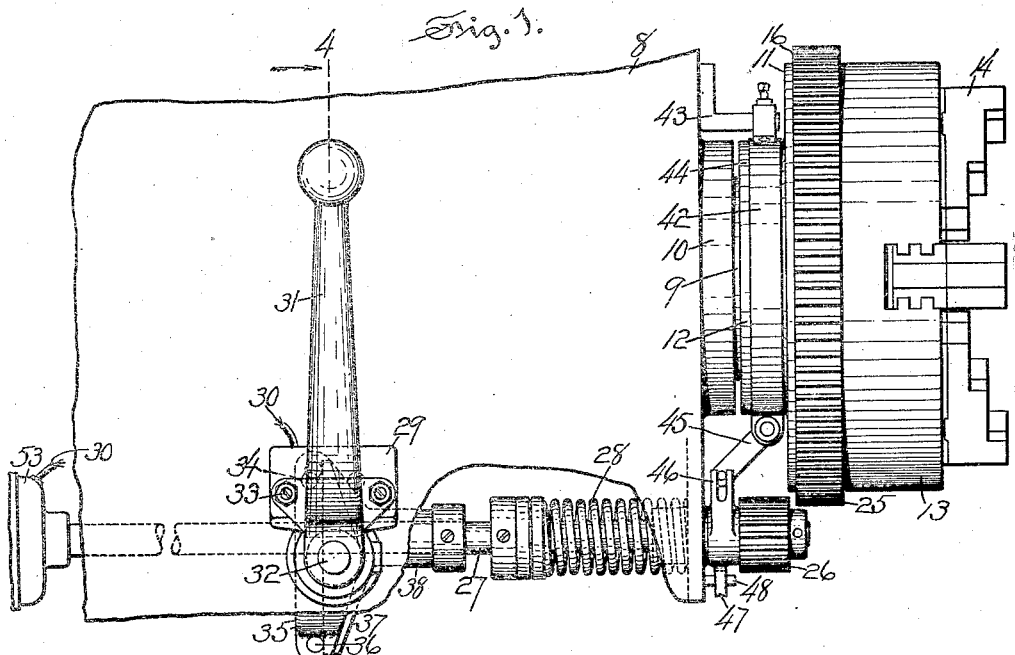
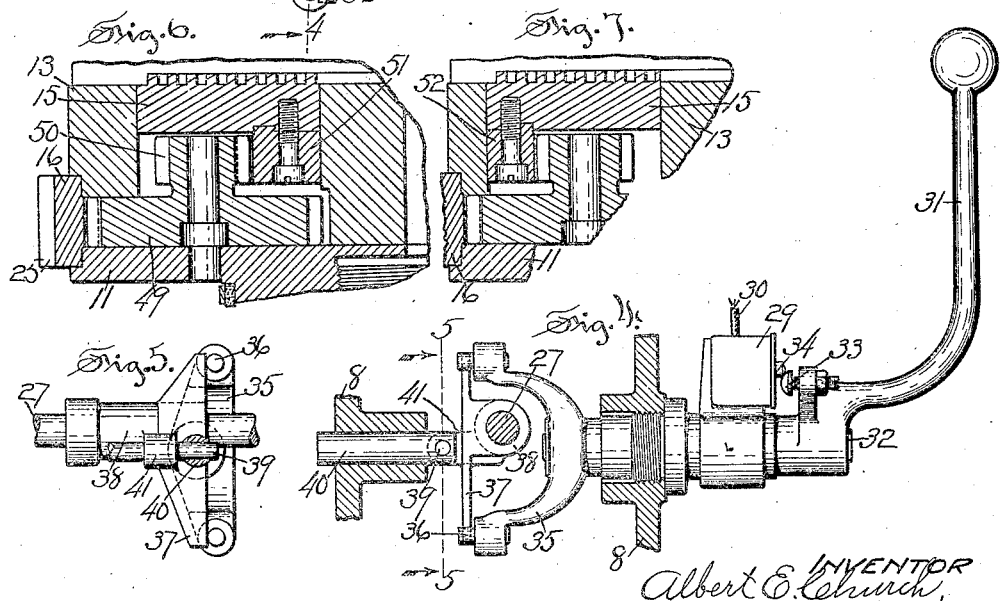

May 26, 1931. A. E. CHURCH 1,807,385

CHUCK

Filed Jan. 25, 1929 2 Sheets-Sheet 2

INVENTOR
Albert E. Church
by Arthur B. Jenkins,
ATTORNEY

Patented May 26, 1931

1,807,385

UNITED STATES PATENT OFFICE

ALBERT E. CHURCH, OF NEW BRITAIN, CONNECTICUT

CHUCK

Application filed January 25, 1929. Serial No. 335,132.

My invention relates more particularly to that class of chucks that are commonly known as scroll chucks, and an object of my invention, among others, is the production of a chuck of this type, together with operating mechanism therefor, that shall be simple in construction and particularly efficient in operation.

One form of a chuck embodying my invention, and in the construction and use of which the objects herein set out, as well as others, may be attained, is illustrated in the accompanying drawings, in which—

Figure 1 is a side view of a portion of the head stock of a lathe equipped with my improved chuck and driving mechanism therefor.

Figure 4 is a detail sectional view taken on line 4—4 of Figure 1 of a portion of the mechanism for controlling operations of the chuck.

Figure 5 is a view in section on a plane denoted by the dotted line 5—5 of Figure 4.

Figure 6 is a detail sectional view of a portion of a chuck illustrating a modified form of construction.

Figure 7 is a similar view illustrating another modification.

Figure 2:
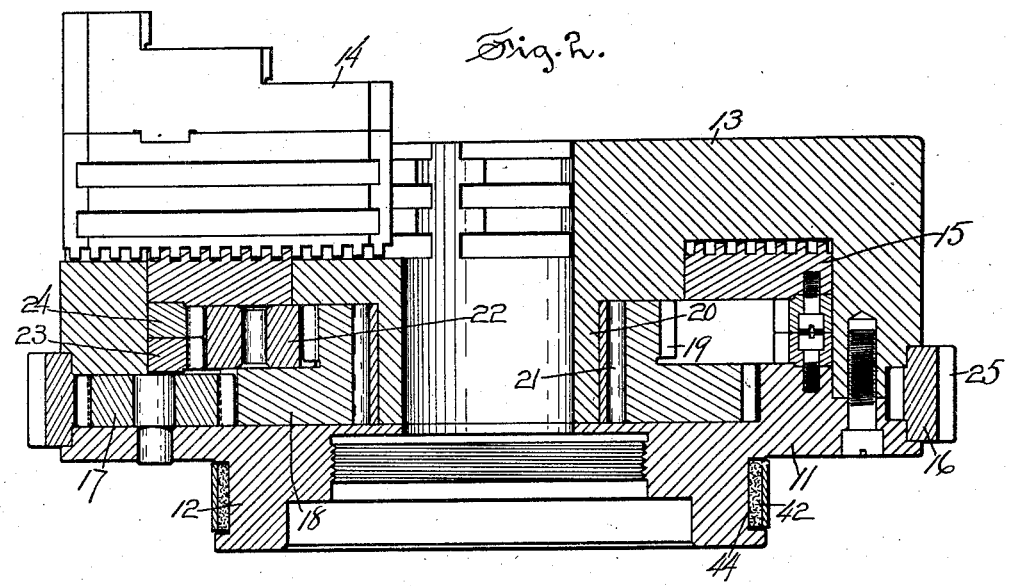
Figure 2 is a view in axial section through my improved chuck.
Figure 3:
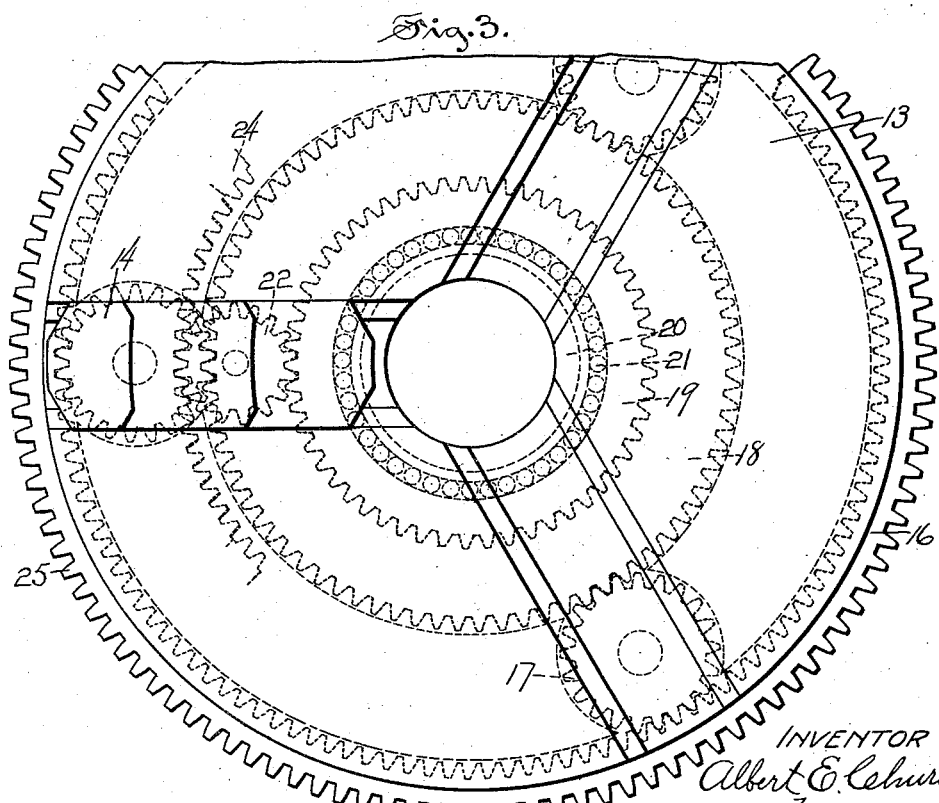
Figure 3 is a face view of the same with one edge broken off.

In the accompanying drawings the numeral 8 indicates a portion of the frame comprising the head stock of a lathe in which a spindle 9 is rotatably mounted in a bearing 10 formed in said head stock. The spindle is arranged in any suitable manner to have the chuck secured thereto, and the spindle may be driven in any suitable way common to structures of this class.

In the form of chuck herein shown a back plate 11 has a hub 12 in which a threaded opening is made for attachment of the threaded end of the spindle 9. The body 13 of the chuck has said back plate secured thereto as by means of screws in a manner common to structures of this class, and said body has radial slots in which chuck jaws 14 are mounted for radial movement as by means of a scroll ring 15 having a spiral scroll or rib engaged with the threaded under surface of the jaws in a manner that will be readily understood, the device thus far described being of old and well-known construction.

In carrying my invention into effect I provide a jaw actuator 16 that is in the form of a ring rotatably mounted in an annular groove in the chuck body 13. This ring has teeth on its inner surface which mesh with the teeth of actuating pinions 17 rotatably mounted in recesses in the back plate 11, there preferably being one of said pinions appurtenant to each of the chuck jaws 14. Said pinions 17 mesh with the teeth of an actuating gear 18 secured to an intermediate gear 19. In the structure herein shown the gears 18 and 19 are made integral each with the other as shown in Figure 2 and they are rotatably mounted upon a hub 20 projecting from the back of the body 13. In the structure herein shown a roller bearing 21 is interposed between said hub and the gears. The gear 19 meshes with a floating pinion 22 of such width that its teeth mesh with the teeth of two controlling rings 23 and 24. The ring 23 is secured to the back plate 11 and the ring 24 is secured to the scroll ring 15, the teeth of these rings being on the inner edges thereof, and said rings together with the gear 19 and pinion 22 are located in a chamber in the body 13, which chamber is closed by the back plate 11.

I contemplate the formation of the controlling rings 23 and 24 in different ways, particularly as to the number of teeth thereon. One of these rings will have a different number of teeth from the other, and it is immaterial to my invention which ring has the most. With the ring 16 rotated in a certain direction, if the ring 24 has the greater number of teeth, the chuck jaws 14 will be moved in one direction, and under the same condition, if the ring 23 has the greater number of teeth, the jaws 14 will be moved in the opposite direction.

In the operation of the device the floating pinion 22 will revolve around the gear 19 and at each revolution, if there be a difference of one tooth between the rings 23 and 24, the ring 24 will be rotated the distance of one tooth, the direction of the rotation of the ring 24 depending upon whether it has more or less teeth than the ring 23. This rotation of the ring 24 will carry with it the scroll ring 15 thereby moving the chuck jaws a slight degree at each revolution of the pinion 22.

My invention contemplates mechanical means for opening and closing the chuck jaws whereby a rapid operation thereof is obtained. To this end I provide the actuator 16 with a set of teeth 25 on its outer edge, and an operating pinion 26 secured to an actuating shaft 27 is arranged to mesh with said teeth. This shaft is rotatably mounted in bearings in the frame 8 and is connected to a motor of any desired kind, and a spring 28 on said shaft exerts its force to move the shaft backwardly to hold the teeth 25 and the pinion 26 normally disengaged. It will be seen from this description that the shaft 27 has a limited lengthwise movement, and its connection with the motor will therefore be such as to permit of such movement, this connection being of any well-known construction and not necessary for an understanding of the present invention.

While I have illustrated and have referred to an electric motor (53) of the reversible type as a means for actuating the shaft 27, other types of motors, as a mechanical motor, may be arranged for connection with the shaft 27 to drive it and for the control in such operation by the lever 31, and I do not therefore consider my invention as limited to an electric motor as the driving means.

Wires for the supply of electricity to the motor extend from a switch-box 29, said wires extending as through a cable 30, as shown in Figures 1 and 4 of the drawings. A switch of any approved form located in the box 29 is operated as by means of a controller lever 31 attached to the end of a rock-shaft 32 mounted in bearings in the lower part of the frame or housing 8. The base of the lever 31 has two buttons 33 secured thereto and adapted to engage push buttons 34 forming a part of the switch. The motor, hereinabove referred to, is of a well-known kind that may be reversed as to its direction of rotation and the switch is such that alternate inward movement of a single button 34 will open and close the switch.

Therefore, if the handle 31 be in its neutral position, and as shown in Figure 1, its movement in one direction will actuate a push button 34 to set the motor connected with the shaft 27 in operation in one direction, and the handle being returned to its neutral position, the same push button 34 will again be pushed in and the motor will be stopped. If the handle 31 be swung in the opposite direction, the same effect will take place upon the motor, except that it will be rotated in an opposite direction from that just hereinabove described.

A yoke 35 secured to the end of the shaft 32 opposite the lever 31 has actuating pins 36 adapted to be moved against the edges of an actuating plate 37 on opposite sides of the shaft 27, and as shown in Figure 4 of the drawings. Said plate has a hub 38 through which the shaft 27 extends, said hub being secured to said shaft. As an aid in steadying the plate 37 a steady pin 39 secured to and projecting from a supporting pin 40 secured in the housing 8 extends into a lug 41 on said plate. As the lever 31 is swung in either direction from its neutral position, one of the pins 36 will engage the plate 37 and thereby move the shaft 27 lengthwise and engage the pinion 26 with the teeth 25. This will set the jaw opening and closing mechanism in operation, and immediately upon release of the handle, the spring 28 will disengage the pinion 26 and teeth 25. It will be noted that this movement of the lever 31 also actuates one of the push buttons 34 to start the motor, this starting of the motor, however, not taking place until after the shaft 27 has been moved far enough to engage the pinion 26 with the teeth 25.

From this it will be seen that movement of the handle 31 in one direction will establish a connection between the motor and the chuck jaw operating mechanism and will also start the motor and the chuck jaws will be moved in one direction. Movement of the handle back to its neutral position will disconnect the parts and stop operation of the jaws, and a movement of the handle in an opposite direction from its neutral position will establish said connection and operation of the motor but the chuck jaws will be moved in an opposite direction, and the return of the handle to its neutral position will stop the operation of the motor and the chuck jaw operating mechanism.

It is quite desirable that when the operation just described for opening or closing the chuck jaws takes place the rotation of the chuck body shall have been stopped, and to insure this result, I provide a brake comprising a brake band 42 secured to a bracket 43 and extending around a drum 44 rigidly connected with the spindle 9. A link 45 is connected with the free ends of the brake band, as by means of interengaging screw threads or turn buckle mechanism of common construction (not shown), so that swinging movements of the link in one direction will close the ends of the band together and apply the brake, and swinging movement of the link in the opposite direction will loosen the brake band. This link is loosely connected as by a pin in slots in a brake actuating arm 46 secured to and projecting from the shaft 27 and held against rotation as by means of a finger 47 on the arm engaged with a pin 48 projecting from the housing 8, and as shown in Figure 1 of the drawings. The hub of the arm 46 rests against a shoulder on the shaft 27. From this it will be seen that when the shaft 27 is moved forward to engage the pinion 26 with the teeth 25 the brake will be applied and therefore stop rotation of the chuck body and consequently of the teeth 25 when the engagement of the pinion and teeth 25 takes place.

In that embodiment of the invention shown in Figure 6 the teeth on the inner edge of the actuator 16 mesh with the teeth of actuating gears 49 having actuating pinions 50 rigidly secured thereto and meshing with the teeth on the outer edge of an actuating ring 51 secured to the scroll 15.

The structure shown in Figure 7 is similar to that just described with respect to Figure 6, except that the pinions 50, instead of being located outside of the actuating ring are located inside of an actuating ring 52 secured to the scroll ring 15. It will be understood that in the structures shown in Figures 6 and 7 there are a plurality of the gears 49 and 50 arranged similarly to the arrangement of the pinions 17 in the structure first hereinabove described.

I claim:

1. A chuck including a chambered body having chuck jaws radially movable thereon and a scroll member engaged with said jaws, an internally toothed member secured to said scroll member, a pinion engaged with said toothed member, an internally and externally toothed jaw actuator rotatably mounted on the exterior of said body, and a geared connection between said actuator and said pinion, said connection including a gear rotatably mounted on said body and in mesh with the teeth on said actuator.

2. A chuck including a chambered body having chuck jaws radially movable thereon and a scroll member engaged with said jaws, a toothed ring secured to said scroll member, an internally and externally toothed jaw actuator rotatably mounted on the exterior of said body, and a geared connection between said actuator and said ring, said connection including a pinion rotatably mounted on said body and having its teeth meshing with teeth on the inner edge of said actuator.

3. A chuck including a chambered body having chuck jaws radially movable thereon and a scroll member engaged with said jaws, an internally and externally toothed jaw actuator rotatably mounted on the exterior cylindrical part of said body, and a geared connection between said actuator and said scroll member and including two driven toothed members of the same diameter and facially engaged, one having a different number of teeth from the other, a single toothed member engaged with both of said driven toothed members and a pinion within the chamber in the body meshing with the teeth on the interior edge of said actuator.

4. A chuck including a chambered body having chuck jaws radially movable thereon and a scroll member engaged with said jaws, two toothed members secured, one to said scroll member, one of said toothed members having a different number of teeth from the other, a jaw actuator rotatably mounted on said body, and a geared connection between said actuator and said toothed member, said connection including a single gear meshing with the teeth of both of said toothed members.

5. A chuck including a chambered body having chuck jaws radially movable thereon and a scroll member engaged with said jaws, two toothed rings of the same diameter, facially contacting and secured one to said scroll member, one of said rings having a different number of teeth from the other, a jaw actuator rotatably mounted on said body, and a geared connection between said actuator and said toothed ring, said connection including a single gear meshing with the teeth of both of said rings.

6. A chuck including a chambered body having chuck jaws radially movable thereon and a scroll member engaged with said jaws, an internally and externally toothed jaw actuator rotatably mounted on the exterior cylindrical outer surface of said body, and a geared connection between said actuator and said scroll member and including two driven toothed members of the same diameter and facially contacting, one having a different number of teeth from the other, a floating pinion having its teeth engaged with both of said driven toothed members and a pinion within the chamber in said body meshing with the teeth on the interior edge of said actuator.

7. A chuck including a rotatably mounted body having chuck jaws radially movable thereon, an internally and externally toothed jaw actuator rotatably mounted on said body, an operative connection between said actuator and chuck jaws and including a pinion meshing with the teeth on the interior edge of said actuator for operating said jaws, a shaft carried operating pinion exteriorly of said body movably mounted for engagement with the teeth on the exterior of said actuator, means for rotating said pinion, and means for engaging it with and for disengaging it from said actuator.

8. A chuck including a rotatably mounted body having chuck jaws radially movable thereon, a toothed jaw actuator movably mounted on said body, an operative connection between said actuator and chuck jaws for operating the latter, an operating pinion movably mounted for engagement with said actuator, means for rotating said pinion, means for engaging it with and for disengaging it from said actuator, a brake for stopping the rotation of said chuck body, and a connection between said pinion engaging and disengaging mechanism and said brake to operate the latter before engagement of said pinion with said actuator.

9. A chuck including a rotatably mounted body having chuck jaws radially movable thereon, a toothed jaw actuator movably mounted on said body, an operative connection between said actuator and chuck jaws for operating the latter, an operating pinion axially movably mounted for engagement with said actuator, means for rotating said pinion, means for moving it in an axial direction, a brake band engaged with said chuck body, means for contracting said band, and a connection between said contracting means and the shaft of said pinion to apply said brake before engagement of the pinion with said actuator.

10. A chuck including a chambered body having chuck jaws movable radially thereon and a scroll member engaged with said jaws, a jaw actuator rotatably mounted on said body, two toothed rings secured, one to said scroll member and the other rigidly connected with said chuck body, one of said rings having a different number of teeth from the other, and a geared connection between said actuator and said toothed rings, said connection including a floating pinion having its teeth engaged with the teeth of both of said rings.

11. A chuck including a rotatably mounted body having chuck jaws radially movable thereon, an internally and externally toothed jaw actuator movably mounted on said body, an operative connection between said actuator and chuck jaws for operating the latter, said connection including a toothed member engaged with the interior teeth of said actuator, an operating pinion exteriorly of the body axially movably mounted for engagement with the exterior teeth of said actuator, a reciprocating shaft carrying the pinion, means for rotating said pinion, a lever connected with said shaft to effect its axial movement, and a connection between said lever and said pinion rotating means to control operations of the latter by movements of said lever.

12. A chuck including a rotatably mounted body having chuck jaws radially movable thereon, a toothed jaw actuator movably mounted on said body, an operative connection between said actuator and said chuck jaws for operating the latter, an operating pinion axially movably mounted for engagement with said actuator, means for rotating said pinion, a lever connected with said pinion for effecting its axial movement, and a connection between said lever and said pinion rotating means to start rotation of said pinion after its engagement with said jaw actuator and to stop rotation of the pinion after its disengagement from said actuator.

13. A chuck including a rotatably mounted body having chuck jaws radially movable thereon, a toothed jaw actuator movably mounted on said body, an operative connection between said actuator and said chuck jaws for operating the latter, an operating pinion axially movably mounted for engagement with said actuator, a shaft on which said pinion is mounted, means for rotating said shaft in opposite directions, a pivotally mounted lever connected with said rotating means and movable in opposite directions to effect corresponding rotation of said shaft in opposite directions, a plate mounted on said shaft to move it lengthwise but to permit rotation of the shaft independently of said plate, and a yoke operatively connected with said lever and loosely engaging said plate on opposite sides of said shaft to effect lengthwise movement of said shaft in the same direction by swinging movement of said lever in either of two opposite directions.

14. A chuck including a rotatably mounted body having chuck jaws radially movable thereon, a toothed jaw actuator movably mounted on said body, an operative connection between said actuator and said chuck jaws for operating the latter, an operating pinion axially movably mounted for engagement with said actuator, electrically controlled driving means to rotate said pinion, a pivotally mounted lever connected with said pinion to effect its axial movement, and a switch positioned to be operated by said lever to start said driving means after engagement of said pinion with said jaw actuator and to stop said driving means in reverse movement of the lever.

15. A holding device including a rotatably mounted body having holding members movably mounted thereon, a toothed holding member actuator movably mounted on said body, an operative connection between said actuator and said holding members for operating the latter, an operating pinion exteriorly of the body axially movably mounted for engagement with said actuator, means for rotating said pinion, a lever connected with said pinion to effect its axial movement, and a connection between said lever and said pinion rotating means to control operations of the latter by movements of said lever.

16. A chuck including a chambered body having chuck jaws radially movable thereon and a scroll member engaged with said jaws, a toothed member attached to said scroll member, an internally and externally toothed jaw actuator rotatably mounted on the outer cylindrical surface of said body, and a connection between said actuator and said toothed member, said connection including a pinion rotatably mounted in said body and engaged with the teeth on the interior edge of said actuator.

ALBERT E. CHURCH.